United States Patent
Nachenberg et al.

(10) Patent No.: US 11,093,607 B1
(45) Date of Patent: Aug. 17, 2021

(54) EFFICIENT PROCESSING OF COMPUTER SECURITY DATA

(71) Applicant: Chronicle LLC, Mountain View, CA (US)

(72) Inventors: Carey Stover Nachenberg, Manhattan Beach, CA (US); William S. Robinson, Menlo Park, CA (US); Shapor Naghibzadeh, San Francisco, CA (US); Michael Wiacek, Mountain View, CA (US); Abu Wawda, Cupertino, CA (US)

(73) Assignee: Chronicle LLC, Mountain View, CA (US)

( * ) Notice: Subject to any disclaimer, the term of this patent is extended or adjusted under 35 U.S.C. 154(b) by 212 days.

(21) Appl. No.: 16/052,883

(22) Filed: Aug. 2, 2018

Related U.S. Application Data

(60) Provisional application No. 62/541,353, filed on Aug. 4, 2017.

(51) Int. Cl.
*G06F 21/55* (2013.01)
*G06F 16/2455* (2019.01)

(52) U.S. Cl.
CPC ........ *G06F 21/552* (2013.01); *G06F 16/2455* (2019.01); *G06F 2221/034* (2013.01)

(58) Field of Classification Search
None
See application file for complete search history.

(56) References Cited

U.S. PATENT DOCUMENTS

| | | | |
|---|---|---|---|
| 8,973,141 B2 | 3/2015 | Rowland et al. | |
| 9,535,961 B2 | 1/2017 | Dash et al. | |
| 9,609,009 B2 | 3/2017 | Muddu et al. | |
| 2015/0180891 A1* | 6/2015 | Seward | H04L 63/1425 726/22 |
| 2015/0222656 A1* | 8/2015 | Haugsnes | H04L 63/1441 726/23 |
| 2015/0295780 A1* | 10/2015 | Hsiao | H04L 43/022 715/736 |
| 2016/0234167 A1* | 8/2016 | Engel | H04L 63/1408 |

* cited by examiner

*Primary Examiner* — Tony Mahmoudi
*Assistant Examiner* — Umar Mian
(74) *Attorney, Agent, or Firm* — Fish & Richardson P.C.

(57) ABSTRACT

The subject matter of this specification generally relates to computer security. In some implementations, a method includes maintaining a first data structure that stores arrays of identifier tuples. Each identifier tuple corresponds to a respective computer security event and includes one or more identifiers for a computing element associated with the computer security event. Each array of identifier tuples corresponds to a respective identifier and only includes identifier tuples that include the corresponding identifier. A second data structure that stores arrays of computer security data is maintained. Each array of computer security data corresponds to a respective identifier tuple stored in the first data structure and only includes computer security data associated with each identifier in the corresponding identifier tuple. A query that specifies a first identifier for a first computing element is received. Identifier tuples that each include the first identifier are obtained from the first data structure.

16 Claims, 4 Drawing Sheets

Table 210 (215 highlights Column Z):

| Row-key | Column 1 | Column 2 | Column Z |
|---|---|---|---|
| i:12.34.56:DNS:7/1/17 | (12.34.56, 0a:bc:23:45), 11:13am | (12.34.56, 0b:c:98:76), 8:31pm | |
| i:12.34.56:DNS:7/2/17 | (12.34.56, Machine A), 3:24pm | (12.34.56, 0b:c:98:76), 4:51am | (12.34.56), 4:51am |
| i:12.34.56:DHCP:7/1/17 | (.34.56, 0f:c:12:34), 11:01am | (12.34.56, Machine D), 2:07am | |
| m:0a:bc:23:45:DNS:7/1/17 | ~~(12.34.56, 0e:be:23:45), 11:13am~~ | ~~(0e:be:23:45, user G), 3:46pm~~ | ~~m:0e:be, Machine-G, 1:46am~~ |
| m:0a:bc:23:45:DNS:7/2/17 | (0a:bc:23:45, 98:76:54), 8:01am | (0a:bc:23:45, user A), 9:21am | |
| *** | *** | *** | *** |
| i:23:45:67:DHCP:7/2/17 | (23:45:67, 78:90:12), 4:33am | (23:45:67, user F), 5:21pm | |

Table 220 (225 highlights Row-key):

| Row-key | Column 1 | Column 2 | Column Z |
|---|---|---|---|
| i:(12.34.56, 0a:bc:23:45): 7/1/17 | Event Data | Event Data | Event Data |
| i:(12.34.56, 0b:c:98:76): 7/1/17 | Event Data | Event Data | |
| i:(12.34.56, Machine A): 7/2/18 | Event Data | Event Data | |
| i:(12.34.56, 0b:c:98:76): 7/2/17 | Event Data | Event Data | |
| i:(12.34.56) | Event Data | Event Data | Event Data |
| i:(12.34.56, 0f:c:12:34): 7/1/17 | Event Data | *** | *** |
| i:(12.34.56, Machine D): 7/1/17 | *** | | |
| i:(23:45:67, user F): 7/2/17 | Event Data | Event Data | |

FIG. 2

EFFICIENT PROCESSING OF COMPUTER SECURITY DATA

CROSS-REFERENCE TO RELATED APPLICATION

This application claims the benefit of U.S. Provisional Application No. 62/541,353, filed Aug. 4, 2017, the contents of which are hereby incorporated by reference.

TECHNICAL FIELD

This disclosure generally relates to computer and network security.

BACKGROUND

Computers and data communication networks are often subjected to intrusion attacks. An intrusion attack may take many forms, such as worms, viruses, phishing, spyware, and the like. In general, many such attacks are facilitated by some form of malicious software. This software is often referred to as malware. Malware attacks can disrupt the operation of computers and/or steal sensitive data. To protect computers from such attacks, network administrators may install security systems, such as anti-virus software and/or firewalls, that detect malware and prevent or mitigate the effects of malware attacks.

SUMMARY

This specification describes systems, methods, devices, and techniques for organizing and indexing computer security data so that relevant data can be retrieved quickly and efficiently, and such that the data storage requirements for maintaining the computer security data are reduced.

In general, one innovative aspect of the subject matter described in this specification can be implemented in a method that includes maintaining a first data structure that stores arrays of identifier tuples. Each identifier tuple can correspond to a respective computer security event and includes one or more identifiers for a computing element associated with the computer security event. Each array of identifier tuples can correspond to a respective identifier and only includes identifier tuples that include the corresponding identifier. A second data structure that stores arrays of computer security data can be maintained. Each array of computer security data can correspond to a respective identifier tuple stored in the first data structure and only includes computer security data associated with each identifier in the corresponding identifier tuple. A query that specifies a first identifier for a first computing element can be received from a client device. One or more identifier tuples that each include the first identifier can be obtained from the first data structure using the first identifier. For each of the one or more identifier tuples, computer security data included in at least one array of computer security data corresponding to the identifier tuple can be obtained from the second data structure. The obtained computer security data can be provided for presentation at the client device. Other embodiments of this aspect include corresponding systems, apparatus, and computer programs, configured to perform the actions of the methods, encoded on computer storage devices.

These and other implementations can optionally include one or more of the following features. In some aspects, the first data structure is a first table and each array of identifier tuples is a row of the first table that includes a cell for each identifier tuple in the array. The second data structure can be a second table and each array of computer security data is a row of the second table that includes a cell for each portion of computer security data in the array.

In some aspects, each row of the first table includes a first row key that is based on the corresponding identifier for the row and a respective first time period. Each identifier tuple in the row can correspond to a computer security event that occurred within the first time period. Each row of the second table can include a second row key that is based on the corresponding identifier tuple for the row and a respective second time period. Each portion of computer security data in the row can correspond to a computer security event that occurred within the second time period.

In some aspects, the query specifies a time period. Obtaining, from the first data structure and using the first identifier, the one or more identifier tuples that each include the first identifier can include identifying each array of identifier tuples in the first data structure that has a first row key that is based on the first identifier and a first time period that is within the time period specified by the query and obtaining each identifier tuple included in each identified array of identifier tuples.

In some aspects, obtaining, from the second data structure, computer security data included in at least one array of computer security corresponding to the identifier tuple can include identifying each array of computer security data in the second data structure that has a second row key that is based on (i) one of the identifier tuples included in each identified array of identifier tuples and (ii) a second time period that is within the time period specified by the query and obtaining the computer security data included in each identified array of computer security data.

In some aspects, the first row key for each row of the first table is based on a particular source type and each identifier tuple in the row includes identifiers that were obtained from a computer security data item received from a source of the particular source type. The query can specify a source type. Obtaining, from the first data structure and using the first identifier, the one or more identifier tuples that each include the first identifier can include identifying each array of identifier tuples in the first data structure that has a row key that is based on the first identifier and the particular source type specified by the query and obtaining each identifier tuple included in each identified array of identifier tuples.

In some aspects, obtaining, from the second data structure, computer security data included in at least one array of computer security data corresponding to the identifier tuple can include identifying each array of computer security data in the second data structure that has a row key that is based on (i) one of the tuples included in each identified array of identifier tuples and (ii) the source type specified by the query and obtaining the computer security data included in each identified array of computer security data.

Some aspects include receiving a new computer security item that includes (i) identifiers that correspond to a new computer security event and (ii) computer security data for the new computer security event. A new identifier tuple that includes the identifiers that correspond to the new computer security event can be added to the first table. The computer security data for the new computer security event can be added to the second table.

In some aspects adding, to the first table, a new identifier tuple that includes the identifiers that correspond to the new computer security event can include identifying a row of the first table that corresponds to a first identifier of the new identifier tuple, determining that the identified row does not include an identifier tuple that matches the new identifier tuple, and adding the new identifier tuple to the identified row. Adding, to the second table, the computer security data for the new computer security event can include identifying a row of the second table that corresponds to the new identifier tuple and adding the computer security data for the new computer security event to the identified row.

Particular embodiments of the subject matter described in this specification can be implemented so as to realize one or more of the following advantages. Computer security data received from telemetry data sources can be indexed in a way that enables fast and efficient retrieval of related identifiers (e.g., identifiers that identify a same device) and retrieval of the computer security data for each of the related identifiers. For a particular identifier (e.g., specified by a query), a tuple association table (or other type of data structure) can be used to identify each related identifier that was specified by a computer security data item that also included the particular identifier for a particular time period. As related identifiers may change over time, this table allows for quick retrieval of current (or past) identifiers that are (or were) related and that may refer to the same device, software, or other computing element. The identified tuples can be used to identify, in a computer security data table (or other data structure), the computer security data for each identifier tuple and for the particular time period. Thus, using the two tables, computer security data for a particular device that may have been associated with multiple identifiers can be quickly and efficiently provided, e.g., in response to a request for computer security data related to a particular identifier.

Indexing the tuples of identifiers and the computer security data for the tuples in this way also substantially reduces the amount of computer security data stored for each computer security event. For example, computer security data related to a set of identifiers and received over a particular time period can be received from multiple telemetry data sources but stored once in a single row of a table that corresponds to the set of identifiers and the particular time period. This reduces the storage requirements for the computer security data allowing for fewer memory storage devices and/or allowing for other data to be stored on the memory storage devices.

This technique of indexing identifiers and computer security data is also idempotent allowing the tables to be the same even when the same telemetry data is received more than once and even when the telemetry data is received out of order. This technique is also massively scalable allowing computer security data to be added at a high rate, for example, using batching and/or parallel processing as the order in which the data is added does not change the way the data is organized.

Various features and advantages of the foregoing subject matter is described below with respect to the figures. Additional features and advantages are apparent from the subject matter described herein and the claims.

DESCRIPTION OF DRAWINGS

FIG. 2 depicts an example tuple association table and an example computer security data table.

Like reference numbers and designations in the various drawings indicate like elements.

DETAILED DESCRIPTION

Figure 1:
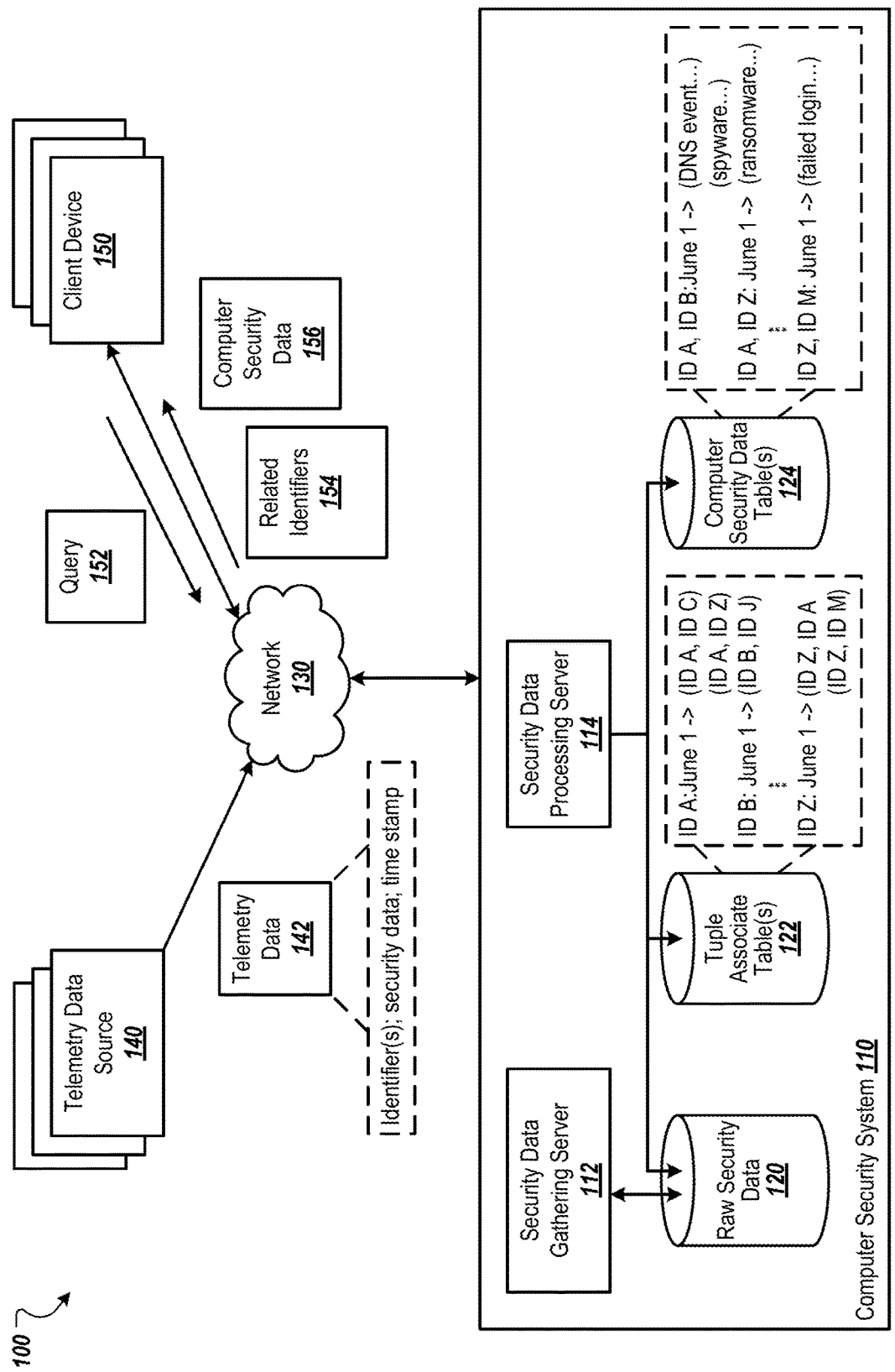
FIG. 1 depicts an example environment in which a computer security system organizes and retrieves computer security data.

In general, this disclosure describes systems, methods, devices, and techniques for organizing and retrieving data related to computer security events. A computer security event is an actual or suspected event that may adversely affect one or more computer or network systems and/or violate a security policy of one or more computer or network systems. Examples of computer security events include the introduction of malware to a computing system, attempts to gain unauthorized access to a system or data, denial or disruption of service, or unauthorized changes to the computing system (e.g., its hardware or software).

Computer security data can be received from data sources, such as threat intelligence feeds, security logs, antivirus software, firewalls, network traffic monitors, other security software, and/or other appropriate data sources or sensors. The computer security data can include one or more computer security data items that are each associated with a particular computer security event. Each computer security data item is a set of data related to its computer security event. For example, each computer security data item can include one or more identifiers related to a computer security event, computer security data related to (e.g., describing) the event, a time stamp specifying the time at which the event occurred, and/or data specifying the source of the computer security data. For example, a computer security data item for a failed login may include one or more identifiers for a computing device from which login data was received and/or one or more identifiers for a computing device, web page, application, or other resource to which a login failed. This example computer security data item can also include data indicating that a failed login occurred and a time at which the failed login occurred.

An identifier uniquely identifies a computing element that is associated with (e.g., involved in) a computer security event. The identifiers can be in the form of Internet Protocol (IP) addresses, media access control (MAC) addresses, machine names, user names, software names, etc. that uniquely identify a computing element at a particular point in time.

A computing element is a real or virtual computing hardware or software component associated with a computer security event. Example computing elements can include hardware devices (e.g., computers, routers, switches, memory devices, etc.), software applications (e.g., antivirus software, firewalls, network monitors), and/or virtual hardware or software (e.g., a virtual machine).

Data for computer security events can be stored in data structures for quick retrieval and compressed storage. A tuple association table can store tuples of identifiers. Each identifier tuple can include one or more identifiers that are received for the same computer security event. That is, each identifier tuple corresponds to a respective computer security event and includes only identifiers that are associated with the computer security event. For example, an identifier tuple can include one or more identifiers specified by an individual computer security data item received from a telemetry data source. The identifiers of an identifier tuple can be identifiers determined to (or predicted to) identify the same computing element. For example, an identifier tuple can include an IP address and a MAC address that have been assigned to the same computing device. In some implementations, the identifiers of an identifier tuple can include identifiers for multiple computing elements associated with the same computer security event.

The tuple association table can be used to identify each identifier tuple that includes a particular identifier, e.g., a particular identifier specified by a query. Thus, the tuple association table can be used to identify identifiers that are related to a particular identifier or that have been involved in the same computer security events as the particular identifier. As identifiers for a device may change over time, the tuple association table can be organized into time buckets so that identifiers related to a particular identifier during a particular time period can be retrieved quickly and efficiently.

A computer security data table can store computer security data for identifier tuples included in the tuple association table. For example, the computer security data table can include a row for each unique identifier tuple. The row for an identifier tuple can include computer security data that was received in computer security data items that specified each identifier of the tuple. That is, each row corresponds to a respective identifier tuple and includes only computer security data that is associated with the identifier tuple. Using the two tables, a system can identify each identifier tuple that includes a particular identifier and identify, for each of the identifier tuples, computer security data related to the identifier tuple. Thus, the system can retrieve computer security data for each identifier tuple that includes a particular identifier and present the data to a user so that the user can view computer security data for a computing element (or multiple computing elements) identified by the particular identifier.

FIG. 1 depicts an example environment 100 in which a computer security system 110 organizes and retrieves computer security data. The computer security system 110 includes a security data gathering server 112 that receives telemetry data 142 from telemetry data sources 140 over a network 130, e.g., a local area network (LAN), a wide area network (WAN), the Internet, a mobile network, or a combination thereof. The telemetry data sources 140 can include computing devices, software, or organizations that detect computer security events and provide telemetry data 142 that includes computer security data related to (e.g., describing) the events. Example telemetry data sources 140 include threat intelligence feeds, security logs, antivirus software, firewalls, other security software, and/or other computer security sensors or network traffic monitors.

The telemetry data 142 can include data for one or more computer security events. For example, the telemetry data 142 received from a telemetry data source 140 can include a computer security data item for each of one or more computer security events. Each computer security data item can include one or more identifiers for devices, software, or other computing elements that are related to the corresponding computer security event. For example, an identifier can identify a computing device (e.g., computer, smartphone, tablet, network device, virtual assistant, etc.), software (e.g., a particular antivirus software that detected a virus or an application that sent data that included malware), or other computing element (e.g., a particular virtual machine in which malware has been detected).

A computer security data item can include one or more identifiers for each of multiple computing elements. For example, a computer security data item can include one or more source identifiers and/or one or more destination identifiers. A source identifier can identify a computing element from which a security event originated. For example, a source identifier can identify a computing device from which a failed login occurred, a device from which malware was received, a device from which a denial-of-service (DoS) attack originated, etc. A destination identifier can identify a computing element that was the target of a security event or that received data related to a security event. For example, a destination identifier can identify a server or resource to which a failed login attempted to gain access, a device at which malware or a DoS attack was received, etc.

Each computer security data item can also include a time stamp that indicates a time and/or date at which the computer security event of the computer security data item occurred, e.g., a time at which a failed login was detected. Each computer security data item can also include computer security data (e.g., raw computer security data) related to the computer security event of the computer security data item. For example, the computer security data can include data identifying the type of event, the type of source of the data, e.g., Domain Name Server (DNS) or Dynamic Host Configuration Protocol (DHCP), a source identifier (e.g., sensor 5), data describing the event (e.g., virus X detected and removed), and/or other appropriate data.

The security data gathering server 112 can store the received telemetry data 142 in a raw security data storage device 120, e.g., one or more hard drives, flash memory, etc. A security data processing server 114 of the computer security system 110 can generate one or more data structures that index and organize the received telemetry data 142 for fast and efficient retrieval and in a way that reduces data storage requirements.

The security data processing server 114 can generate one or more tuple association tables 122 (or other type of data structure, e.g., database, vectors, group of arrays of data elements, etc.) that each store tuples of related identifiers for computing elements. In some implementations, the tuple association table 122 includes one or more rows (or other arrays) for each individual identifier.

Each row corresponds to a particular identifier and includes only tuples that include the particular identifier and optionally one or more different identifiers related to the particular identifier. For example, each identifier tuple in a row for a particular identifier can include one or more identifiers that were received together with the particular identifier in a same computer security data item from a telemetry data source 140. In a particular example, the particular identifier can be an IP address for a computer from which a virus was received. A computer security data item for the virus detection can specify the IP address and a MAC address for the computer. In this example, a row of the tuple association table 122 for the IP address can include an identifier tuple that includes the IP address and the MAC address for the computer. In some implementations, each identifier tuple can also include a source identifier for the source of the telemetry data 142 that included the identifier(s) of the identifier tuple.

Rows are types of arrays that can map identifiers with their respective identifier tuples. Instead of rows, a data structure can use other types of arrays for mapping identifiers with its identifier tuples. Each array for a particular identifier can include one or more identifier tuples that each includes the particular identifier.

For each identifier, the tuple association table 122 can include a row for each time bucket and/or each computer security data source from which computer security data related to the identifier has been received. Each time bucket can correspond to a particular time period, e.g., a day, an hour of a day, a week, or another appropriate time period. For example, the tuple association table 122 can include, for each identifier, a row for each day. In this example, the row for a particular identifier and for a particular day can include the identifier tuples that specify the particular identifier and that were received in computer security data items for computer security events that occurred on the particular day. By including a row for each time period, the tuple association table 122 can be queried based on time period. For example, a user may be interested in which identifiers were related to a particular identifier on a particular day. The user could query the tuple association table 122, as described in more detail below, and receive a list of the identifiers included in the row of the tuple association table 122 for the particular identifier and for the particular day.

As some identifiers for a device can change over time, separating the tuple association table 122 into rows based on time buckets allows users to access which identifiers were related to a particular identifier at particular points in time. For example, an IP address may be reassigned to multiple different devices over time. If a query is received for the IP address, the security data processing server 114 can access the tuple association table 122 and identify the devices (e.g., by machine identifier) included in identifier tuples that also include the IP address.

Similarly, having separate rows for each type of computer security data source allows users to query based on the type of source. For example, a user may be interested in DNS events for a particular identifier rather than DHCP events. Having separate rows for each type of data source and each time bucket allows users to query based on source and time, e.g., to retrieve a list of identifiers that were related to a particular identifier based on computer security data received from a particular type of source and over a particular time period. In this example, the tuple association table 122 can include, for each identifier, a row for each time bucket and data source. For example, if the time buckets are per day and there are two types of data sources, the tuple association table 122 can include, for an identifier, two rows for each day where one row is for the first type of data source and the second row is for the second type of data source. In some implementations, if a row would not include any identifier tuples, the tuple association table 122 may not include the row, e.g., until the row is created for an identifier tuple that would be placed into the row.

In some implementations, the cells of the tuple association table 122 are time bucketed. For example, each cell of the tuple association table 122 for an identifier can include identifier tuples for computer security events that involved the identifier and that occurred during a particular time period. In a particular example, each cell can be for a particular day and the cell for a particular day for a particular identifier can include identifier tuples for computer security events that occurred on that particular day and that involved the particular identifier (e.g., computer security data specified the particular identifier and included a time stamp that specified the particular day). This cell-based time bucketing can be useful in database software that does not define rows or that have a limited number of cells in each row. For example, bucketing tuples into time-based cells can reduce the number of cells used in each row.

In some implementations, the rows of the tuple association table 122 can be bucketed based on a first time period and the cells of the tuple association table 122 can be bucketed based on a second time period. The time period for the cells can be shorter than the time period for the cells. For example, the tuple association table 122 can include, for each identifier, a row for each day that includes the identifier tuples for computer security events that occurred during that day. Each cell in the row for a particular day can include identifier tuples for computer security events that occurred during a particular hour of the day. In this example, the tuple association table 122 can include, for a particular identifier, a row for each day that a computer security event occurred that involved the particular identifier. Each row can include twenty-four cells, one of reach hour of the day.

In some implementations, the tuple association table 122 includes time buckets based on multiple time periods, e.g., to support different levels of granularity in queries. For example, the tuple association table 122 can include, for each identifier, a row for each day. The row for a particular day and for a particular identifier can include the identifier tuples for computer security events that occurred on the particular day. The tuple association table 122 can also include, for each identifier, a row for each month. The row for a particular month and for a particular identifier can include the tuples of identifiers for computer security events that occurred during the particular month. In this example, an identifier tuple for a computer security event that occurred on a particular day can be included in the row for the particular day and included in the row for the month in which the particular day fell.

The granularity of the time period for each row of tuples can vary based on the type of source from which computer security data was received, the type of identifiers included in the rows, or other criteria. For example, identifier tuples obtained from computer security data items for DNS events can be separated into rows based on the day and identifier tuples obtained from computer security data items for DHCP events can be separated into rows based on the hour. In this example, the tuple association table 122 can include, for a particular identifier, a row of identifier tuples for each day that includes identifier tuples that were obtained from computer security data items that specified a DNS event and that specified the particular identifier. The tuple association table 122 can also include, for the particular identifier, a row of tuples for each month that includes identifier tuples that were obtained from computer security data items that specified a DHCP event and that specified the particular identifier.

Each row of the tuple association table 122 can include a row key that is based on the corresponding identifier for the row. For example, the row key can include the identifier or a value that is based on the identifier. The value can be a hash of the identifier to prevent identifier information from being stored in row keys. The row key can also be based on the time period of the row if the identifier tuples are bucketed based on time period, the source of the computer security data if the identifier tuples are bucketed by source type, and/or the type of identifier for which the row includes tuples of identifiers.

In some implementations, the row key for each row is based on an inverse of the time period for the row. For example, the row key can be based on a particular time (e.g., a maximum time value) minus the actual time for the row. In this way, the tuple association table 122 can be queried for the first event that occurred before a particular point in time.

The security data processing server 114 can also create one or more computer security data tables 124 (or other types of data structure, e.g., database, vectors, group of arrays of data elements, etc.) that each stores computer security data. In some implementations, the computer security data table 124 includes one or more rows (or other arrays) for each of a multitude of identifier tuples. For example, the computer security data table 124 can include one or more rows for each identifier tuple included in the tuple association table 122.

Each row for a particular identifier tuple corresponds to a particular identifier tuple and includes computer security data for the particular identifier tuple. For example, each identifier tuple can be added to the tuple association table 122 in response to receiving a computer security event data item that indicates that each identifier of the identifier tuple was involved in the same computer security event. The computer security data included in the security event data item can then be added to a row of the computer security data table 124 that corresponds to the identifier tuple. In this way, computer security data for computer security data events that involved a set of one or more identifiers can be retrieved from the computer security data table 124.

In the computer security data table 124, each row corresponding to a particular identifier tuple may only include computer security data for computer security events that involved each identifier in the identifier tuple. In this way, the row only includes the computer security data for computer security events in which the identifiers were related to the same device or other computing element.

Instead of rows, a data structure can use other types of arrays for mapping identifier tuples with their computer security data. For example, a data structure can include one or more arrays of data elements for each identifier tuple, where each data element includes computer security data for the identifier tuple. Each array for a particular identifier tuple can include computer security data for computer security events that involved each identifier of the identifier tuple.

Similar to the tuple association table 122, the rows of the computer security data table 124 can be bucketed based on time period and/or based on the type of computer security data source. For example, each row of the computer security data table 124 can correspond to a particular identifier tuple, a particular time period, and/or a particular type of source. Similarly, the cells of the computer security data table 124 can be bucketed based on time. For example, each row that corresponds to particular identifier tuple can include computer security data for computer security events that occurred during a particular day and each cell in the row can include computer security data for computer security events that occurred during a particular hour of the particular day.

The granularity of the time periods for the rows and/or the cells can be based on the type of source from which the computer security data was received, the type of identifiers in the identifier tuple for the row, or other criteria. For example, computer security data obtained from computer security data items for DNS events can be separated into rows based on the day and computer security data obtained from computer security data items for DHCP events can be separated into rows based on the hour.

Each row of the computer security data table 124 can include a row key that is based on the corresponding identifier tuple for the row. For example, the row key can include each identifier of the corresponding identifier tuple or a value that is based on the identifier(s) of the corresponding identifier tuple. The value can be a hash of the identifier(s). The row key can also be based on the time period of the row if the computer security data is bucketed based on time period, the source of the computer security data if the computer security data is bucketed by source type, and/or the type of identifier for which the row includes tuples of identifiers. Similar to the tuple association table 122, the row key for each row can be based on an inverse of the time period for the row.

By storing the computer security data in rows that are based on identifier tuples rather than individual identifiers, the memory storage requirements for storing the computer security data table 124 can be significantly reduced. For example, a computer security event can include many different identifiers. If the data is stored in a row for each identifier of the identifier tuple, the data would be duplicated for each of the multiple identifiers.

The security data processing server 114 can provide data identifying related identifiers 154 and/or computer security data 156 for one or more identifiers in response to queries 152 received from client devices 150, e.g., computers, smartphones, etc. For example, a user of a client device 150 can submit a query 152 that specifies a particular identifier, a time period, a type of computer security data source (e.g., DNS or DHCP), and/or a particular computer security data source (e.g., sensor 12).

The security data processing server 114 can access the tuple association table 122 and use the query to identify tuples of identifiers related to the query. For example, if the query specifies a particular identifier, the security data processing server 114 can compare the particular identifier (or a value that is based on the particular identifier, such as a hash of the particular identifier) to the row keys of the tuple association table 122 to identify each row for the particular identifier. The security data processing server 114 can then identify each identifier tuple in each of the identified rows and return to the client device 150 the list of identifiers in the identified identifier tuples.

If the query specifies a time period, a type of computer security data source or a particular computer security data source in addition to the particular identifier, the security data processing server 114 can identify the rows of the tuple association table 122 that match the specified time period, type of computer security data source or particular computer security data source in addition to matching the particular identifier. The security data processing server 114 can then identify each identifier tuple in each of the identified rows and return to the client device 150 the list of identifiers in the identified identifier tuples.

The security data processing server 114 can also use the identified identifier tuples to retrieve computer security data from the computer security data table 124. For example, the security data processing server 114 can compare each identified identifier tuple (or a value that is based on the identifier tuple, such as a hash of the identifier tuple to prevent identifying information from being stored in row keys) to the row keys of the computer security data table 124 to identify each row corresponding to each of the identified identifier tuples. If the query specifies a time period, a type of computer security data source or a particular computer security data source in addition to the particular identifier, the security data processing server 114 can identify the rows of the computer security data table 124 that match the specified time period, type of computer security data source or particular computer security data source in addition to matching the identified identifier tuple. The security data processing server 114 can then retrieve the computer security data from each identified row and provide the computer security data 156 to the client device 150 for presentation to the user.

In some implementations, the security data processing server 114 can automatically crawl the tuple association table 122 and the computer security data table 124 for data to provide in response to a query 152. For example, an IP address can be reassigned to multiple different devices over time. For the IP address, the security data processing server 114 may identify multiple machine names in identifier tuples that also include the IP address. In this example, the security data processing server 114 can identify the identifier tuples that include each machine name. These identifier tuples may not include the IP address, resulting in additional identifiers related to the IP address being retrieved by the security data processing server 114. The security data processing server 114 can then use the additional identifier tuples to identify additional computer security data related to the IP address in the computer security data table 124.

FIG. 2 depicts an example tuple association table 210 and an example computer security data table 220. The tuple association table 210 includes rows corresponding to identifiers. In each row corresponding to an identifier, the tuple association table 210 includes cells that include identifier tuples. For example, the first three rows of the tuples association table 210 include identifier tuples for an IP address "12.34.56."

Each row of the tuple association table 210 includes a row key that can specify the corresponding identifier (or a value based on the identifier, e.g., a hash of the identifier) for the row. In this example, each row key is in the form of "identifier type:identifier:source type:time." The identifier type is the type of identifier for which the row includes identifier tuples. The identifier type can include a letter or other symbol for a type of identifier, e.g., "i" for IP address, "m" for MAC address, "u" for user name, etc. The identifier in each row key is the corresponding identifier (or a value based on the identifier, e.g., a hash of the identifier) of the computing element (e.g., device, software, etc.) for the row.

The source type is the type of source from which the identifier tuples in the row were received. For example, computer security data can be received from multiple different types of sources (e.g., DNS, DHCP, threat feeds, etc.). In this example, each row of the tuple association table 210 includes only tuple identifiers received from a particular type of source. For example, the second row of the tuple association table 210 includes identifier tuples that include the IP address 12.34.56 and that were received from a DNS source while the third row includes identifier tuples that include the IP address and that were received from DHCP sources.

In some implementations, the identifier tuples for each identifier may not be placed into separate rows based on source type. For example, a single row can include identifier tuples received from multiple different source types. In such examples, the row key may not include source type.

The time of the row key specifies a time period for the row key's row. In this example, the rows are time bucketed by day. That is, each row for an identifier includes identifier tuples that were obtained from computer security data for a computer security event that occurred on that day. For example, the first row of the tuple association table 210 includes identifier tuples for IP address 12.34.56 that were specified by computer security data for a computer security event that occurred on Jul. 1, 2017 and the second row of the tuple association table includes identifier tuples for IP address 12.34.56 that were specified by computer security data for a computer security event that occurred on Jul. 1, 2017.

The time period can be other time periods, such as each hour, each week, each month, etc. In addition, as discussed above, different source types or different identifier types can be time bucketed based on different time periods and/or the same source types and same identifier types can be time bucketed based on multiple time periods (e.g., a row for each day and a row for each month).

In some implementations, the identifier tuples for each identifier may not be placed into separate rows based on time period. For example, a single row can include identifier tuples received at any time. In such examples, the row key may not include the time.

In some implementations, the elements of the row keys can be in different orders. For example, rather than having the identifier type first in the row keys, the identifier can be first in the row keys. The order of the elements can be based on how the rows should be sorted or queried. For example, if the identifier tuples are to be sorted based on identifier type, then identifier type can be first in the row keys.

Each cell in a row includes one or more identifier tuples that correspond to the row key for the row. An identifier tuple corresponds to the row key for a row when the identifier tuple includes the identifier of the row key (and optionally one or more additional identifiers), was obtained from computer security data received from a source that is of the same type as source type of the row key, and was obtained from computer security data for a computer security event that occurred during the time period of the row key. For example, the cell in column 1 of the first row of the tuple association table 210 includes an identifier tuple "12.34.56, 0a:bc:23:45" and a time stamp of "11:13 AM." This cell corresponds to a computer security event that occurred at 11:13 AM on Jul. 1, 2017 and involved a device that was assigned IP address 12.34.56 and MAC address 0a:bc:23:45.

In some implementations, the number of columns in a row (or data elements in an array) varies based on the number of identifier tuples identified for inclusion in the row. An identifier tuple can be identified for inclusion in a row when the identifier tuple includes the identifier for the row. If the rows are bucketed by time, an identifier tuple can be identified for inclusion in a row if the identifier tuple is obtained from computer security data for a computer security event that occurred at a time that is within the time period for the row. Similarly, if the rows are bucketed by source type, an identifier tuple can be identified for inclusion in a row if the identifier tuple is obtained from computer security data received from a source type that is the same as the source type for the row. For example, the security data processing server 114 of FIG. 1 can create a column for a row in response to identifying a new identifier tuple for the row. In some implementations, each row has a specified number of cells and some cells of the row may be empty.

In some implementations, a row of the tuple association table 210 can be separated into two or more rows. For example, to keep the size of each row to a specified size (e.g., a specified number of cells), a new row may be added to the tuple association table 210 when the size of a row would exceed the specified size.

As described above, the cells of the rows can also be time bucketed. For example, column 1 can include identifier tuples for computer security events that occurred during a particular hour (e.g., from 12:00 AM to 1:00 AM) and column 2 can include identifier tuples for computer security events that occurred during a different hour (e.g., from 1:00 AM to 2:00 AM).

The same identifier tuple can be included in multiple rows. For example, if the identifier tuple includes two or more identifiers, the identifier tuple can be included in the row for each of the two or more identifiers. In a particular example, the identifier tuple "12.34.56, 0a:bc:23:45" is included in the first row (for IP address 12.34.56) and the fourth row, which is for MAC address 0a:bc:23:45. In some implementations, the order of identifiers in the identifier tuples is the same in each row. For example, IP address 12.34.56 is before MAC address 01:bc:23:45 in the first row and in the fourth row. This allows for the identifier tuple to be used once when accessing the computer security data table 220 rather than querying the computer security data table 220 multiple times using the same identifier tuple in multiple different orders. This ordering also allows for computer security data for the identifier tuple to be stored fewer times rather than storing the same data in a different row for each ordering of the identifier tuple, resulting in less memory consumed by the tables 210 and 220.

The computer security data table 220 includes rows for computer security data (e.g., raw security data in the same form as it was received from a telemetry source or formatted data). Each row of the computer security data table 220 corresponds to a particular identifier tuple, e.g., a particular identifier tuple of the tuple association table 210, and includes computer security data received in computer security event data items that specify each identifier of the particular identifier tuple. For example, to be included in a particular row for a particular identifier tuple, the computer security data may have to have been received in computer security data item that specifies all identifiers in the particular identifier tuple or received in data that specifies that all of the identifiers were involved in the same computer security event.

In each row for an identifier tuple, the computer security data table 220 includes cells that include computer security data for the identifier tuple. For example, the first for of the computer security data table 220 includes computer security data for the identifier tuple "12.34.56, 0a:bc:23:45." Each cell in the first row can include computer security data received in a computer security data item that specified IP address 12.34.56 and MAC address 0a:bc:23:45.

Each row of the computer security data table includes a row key that can specify the corresponding identifier tuple (or a value based on the identifier tuple, e.g., a hash of the identifier tuple) for the row. In this example, each row key is in the form of "identifier type:identifier:time." The identifier type is the type of the first identifier in the identifier tuple for which the row includes computer security data, e.g., "i" for IP address, "m" for MAC address, etc. The identifier tuple in each row key is the corresponding identifier tuple for the row. The identifier tuple in the row key can be the identifier tuple or a value based on the identifier tuple, e.g., a hash of the identifier tuple.

The time of the row key specifies a time period for the row key's row. In this example, the rows are time bucketed by day. That is, each row for an identifier tuple includes computer security data that was obtained from computer security data for a computer security event that occurred on that day. For example, the first row of the computer security data table 220 includes computer security data for the identifier tuple "12.34.56, 0a:bc:23:45" that was included in computer security data for a computer security event that occurred on Jul. 1, 2017.

The time period can be other time periods, such as each hour, each week, each month, etc. In addition, as discussed above, different source types or different identifier types can be time bucketed based on different time periods and/or the same source types and same identifier types can be time bucketed based on multiple time periods (e.g., a row for each day and a row for each month). In some implementations, the computer security data for each identifier tuple may not be placed into separate rows based on time period. For example, a single row can include computer security data received at any time. In such examples, the row key may not include the time.

Each cell in a row includes computer security data for one or more computer security events that involved each identifier of the identifier tuple and was received with computer security data for a computer security event that occurred during the time period of the row key.

In some implementations, the number of columns in a row (or data elements in an array) varies based on the number of individual computer security events identified for inclusion in the row. For example, the security data processing server 114 of FIG. 1 can create a column for a row in response to identifying new computer security data for the row. In some implementations, each row has a specified number of rows and some cells of the row may be empty.

As described above, the cells of the rows can also be time bucketed. For example, column 1 can include computer security data for computer security events that occurred during a particular hour (e.g., from 12:00 AM to 1:00 AM) and column 2 can include computer security data for computer security events that occurred during a different hour (e.g., from 1:00 AM to 2:00 AM).

Using the above table formats, the tables 210 and 220 are idempotent and will be the same no matter what order the data is added to the tables 210 and 220. For example, when a new identifier tuple or portion of computer security data is added to one of the tables 210 or 220, the data can be added to an appropriate column of an appropriate row. Thus, if computer security data for an earlier event was added to the tables 210 and 220 after data for a later occurring event was added, the tables 210 and 220 will be same as if the data for the earlier event was added before the data for the later event.

The two tables 210 and 220 can be used to retrieve identifiers that are (or were) related to a particular identifier and/or retrieve computer security data for identifier tuples that include the particular identifier. For example, if a query is received that specifies the IP address "12.34.56," the query (or a hash of the query) can be compared to the row keys of the tuple association table 210. In this example, the first four rows of the tuple association table 210 would be found to match the query, as shown by the dashed box 215. In some implementations, queries that specify a time, time period, identifier type, and/or a source type can be compared to the row keys of the tuple association table 210 to identify row keys that match each element of the query.

The identifier tuples in each matching row of the tuple association table 210 can then be used to identify computer security data in the rows of the computer security data table 220 that are for the identifier tuples. For example, each identifier tuple included in the matching rows of the tuple association table 210 can be compared to the row keys of the computer security data table 220 to identify matching rows. If the query specified an identifier type or time period, the identifier type and/or time period can also be compared to the row keys along with the identifier tuples to identify matching rows. As shown in the dashed box 225, the first seven rows of the computer security data table 220 includes a row key having an identifier tuple that matches the identifier tuples including in the matching rows of the tuple association table 210, i.e., the identifier tuples included in the dashed box 215.

Figure 3:
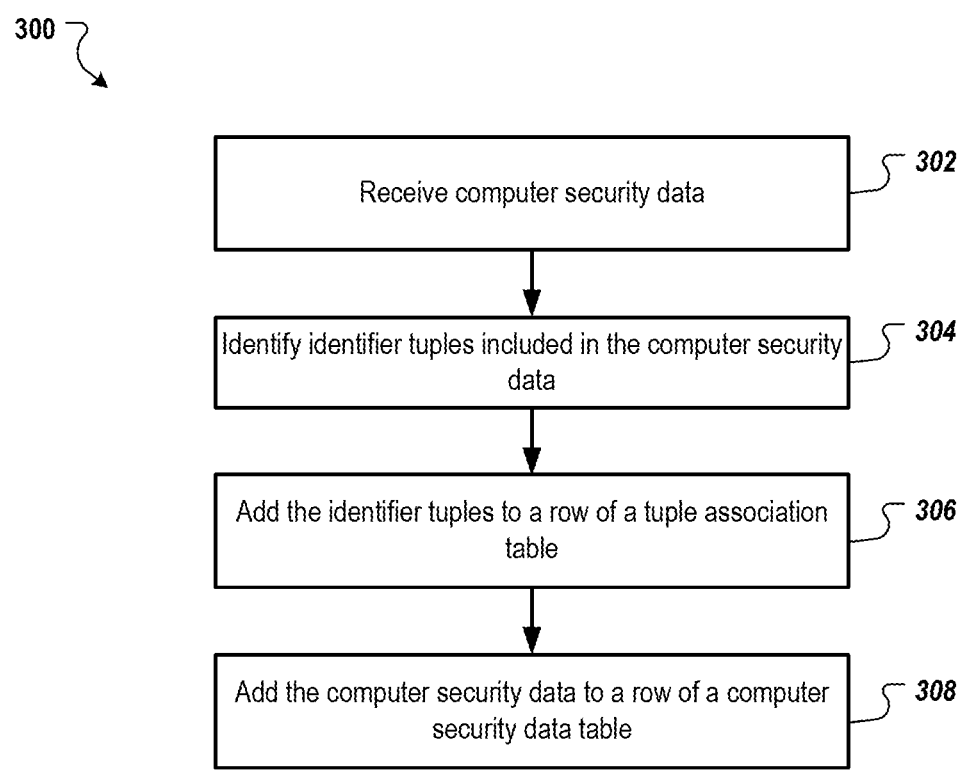
FIG. 3 depicts a flowchart of an example process for organizing computer security data.

FIG. 3 depicts a flowchart of an example process 300 for organizing computer security data. Operations of the process 300 can be implemented, for example, by a system that includes one or more data processing apparatus, such as the computer security system 110 of FIG. 1. The process 300 can also be implemented by instructions stored on a computer storage medium where execution of the instructions by a system that includes a data processing apparatus cause the data processing apparatus to perform the operations of the process 300.

The system receives computer security data (302). The computer security data can be received from one or more computer security telemetry data sources, e.g., threat intelligence feeds, antivirus software, etc. The received computer security data can include data related to computer security events. The computer security data for a computer security event can include, for example, one or more identifiers of computing elements involved in the event, a time stamp indicating a date and/or time at which the event occurred, data describing the event, and/or data identifying the source of the computer security data.

The system identifies one or more identifier tuples in the computer security data (304). In some implementations, the system identifies, for inclusion in an identifier tuple, one or more identifiers that refer to the same computing element (e.g., to the same device). For example, computer security data for a computer security event can include identifiers for each device involved in the computer security event and can include data specifying which identifiers are related (e.g., by including a group of identifiers for each device). The system can parse the computer security data to identify an identifier tuple for each device.

The system adds each identifier tuple to a row of a tuple association table (306). In some implementations, the system can identify one or more rows of the tuple association table that includes an identifier of the identifier tuple. For example, the system can identify one or more rows of the tuple association table that includes a row key that includes the identifier (or that has a value that matches a value based on the identifier, e.g., a hash of the identifier).

If the rows of the tuple association table are separated based on time period, source type, or identifier type, the system can identify the row(s) that have a row key that matches an identifier of the identifier tuple, a time period in which the time stamp of the computer security data falls, a source type that matches the type of source from which the computer security data was received, and an identifier type that matches the type of identifier for the identifier that matches the row key.

The system can then add the identifier tuple to the matching row(s). If the identifier tuple includes multiple identifiers, the identifier tuple can be added to a respective row for each identifier of the identifier tuple. In some implementations, the order of identifiers in the tuple of identifiers is the same in each row in which the identifier tuple is added. If the tuple association table does not include a matching row for an identifier of the identifier tuples, the system can create a new row for the identifier and include the identifier tuple in the new row.

If the cells of the tuple association table are bucketed based on time, the system identifies the appropriate cell for the identifier tuple(s) based on the time stamp of the computer security data. The system can add the identifier tuple to the cell that has a time range in which the time stamp falls.

The system adds the computer security data to a computer security data table (308). The system can identify one or more rows of the computer security data table for each identifier tuple identified in the computer security data. For example, each row of the computer security data table can include a row key that includes an identifier tuple or a value that is based on an identifier tuple. For each identifier tuple, the system can identify one or more rows that include a row key that includes the identifier tuple or a value that is based on the identifier tuple.

If the rows of the computer security data table are separated based on time period, source type, or identifier type, the system can identify the row(s) that have a row key that matches the identifier tuple, a time period in which the time stamp of the computer security data falls, a source type that matches the type of source from which the computer security data was received, and an identifier type that matches the type of identifier for the identifier of the identifier tuple that matches the row key.

The system can then add the computer security data to the matching row(s). If the computer security data table does not include a matching row for an identifier tuple, the system can create a new row for the identifier tuple and include the computer security data in the new row.

If the cells of the computer security data table are bucketed based on time, the system identifies the appropriate cell for the computer security data based on the time stamp of the computer security data. The system can add the computer security data to the cell that has a time range in which the time stamp falls.

The computer security data added to the computer security data table can include the payload of the received computer security data, e.g., raw security data. Or, the system can format the data before adding the data to the computer security data table.

In some implementations, the system can use microbatching techniques to add identifier tuples to the tuple association table and computer security data to the computer security data table. Micro-batching techniques generally involve processing incoming tasks in small batches, rather than one at a time or in a single large batch. For example, the system can apply micro-batching techniques to process incoming telemetry data received by the system, gather all unique identifier tuples across the computer security events, and then perform bulk insertions into the tables. This ensures that the system only has to write once per identifier tuple, even if many computer security events have the same identifier tuple.

Micro-batching also allows the system to identify potential high fan-out situations in which an identifier maps to many (e.g., thousands) of identifier tuples. For high fan-out identifiers, the system can create multiple rows in the tuple association table for storing the identifier tuples or create a summary row that indicates that there is a large number of identifier tuples for the identifier without storing the identifier tuples in the tuple association table. For example, each row of the tuple association table may include up to a specified number of cells. If the number of identifier tuples for an identifier exceeds the specified number, the system can create, for the identifier, multiple rows to store the identifier tuples, where each row includes up to the specified number of identifier tuples. If the number of identifier tuples for an identifier exceeds a threshold for creating a summary row, the system may create a summary row rather than creating a large number of rows for the identifier.

Figure 4:
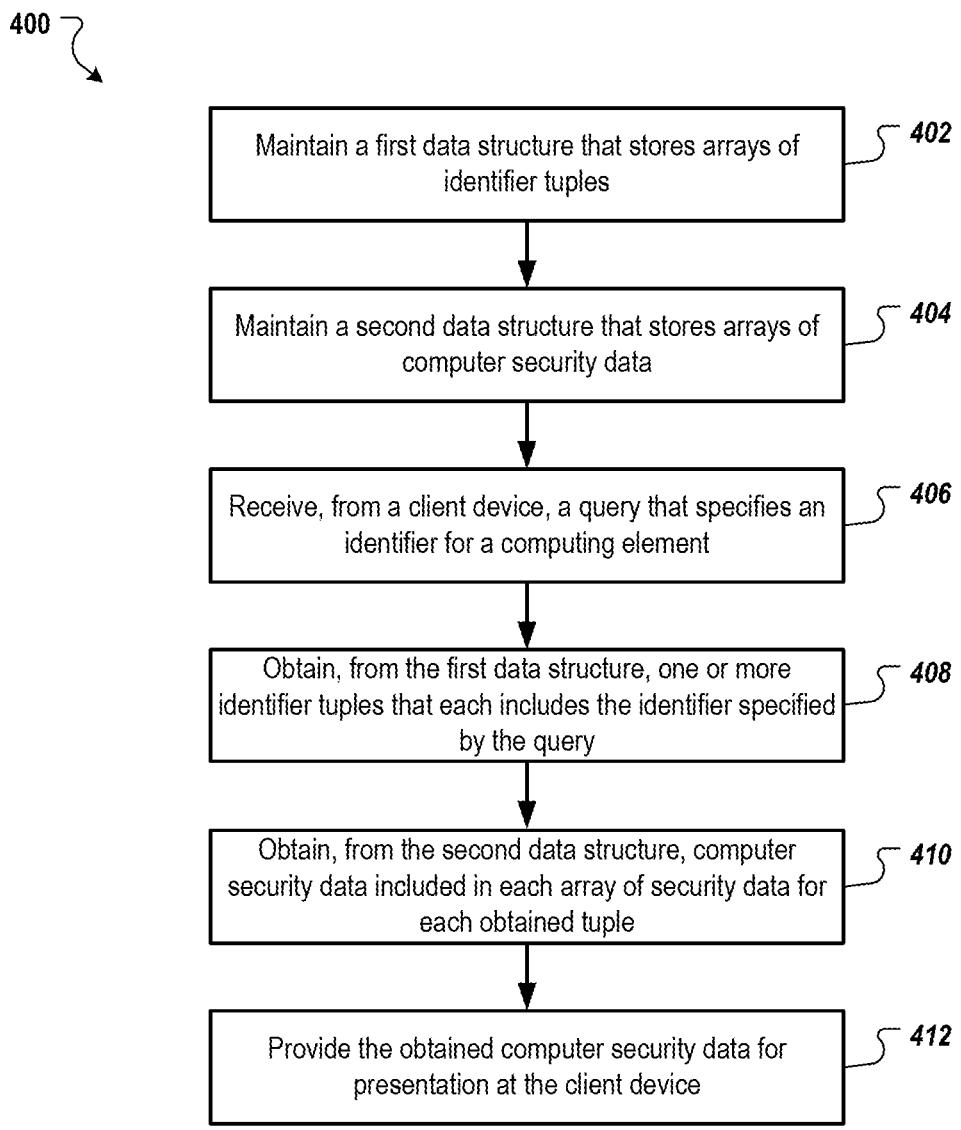
FIG. 4 depicts a flowchart of an example process for retrieving computer security data for a particular identifier.

FIG. 4 depicts a flowchart of an example process 400 for retrieving computer security data for a particular identifier. Operations of the process 400 can be implemented, for example, by a system that includes one or more data processing apparatus, such as the computer security system 110 of FIG. 1. The process 400 can also be implemented by instructions stored on a computer storage medium where execution of the instructions by a system that includes a data processing apparatus cause the data processing apparatus to perform the operations of the process 400.

The system maintains a first data structure that stores arrays of identifier tuples (402). In some implementations, the first data structure is a table that includes rows (or columns) of identifier tuples. For example, the first data structure can be a tuple association table that includes, for each of multiple identifiers, one or more rows of identifier tuples. The system can maintain the first data structure by adding identifier tuples to the first data structure in response to receiving telemetry data, as described above.

For example, when new telemetry data is received, the system can identify identifier tuples in the telemetry data. The system can determine whether the identifier tuple is stored in the appropriate row(s) of the tuple association table (e.g., in the row(s) corresponding to each identifier in the identifier tuple). If the rows are time bucketed, the system can determine whether the identifier tuple is stored in the row(s) that correspond to each identifier and that correspond to a time period in which the time stamp of the new telemetry data falls. If the identifier tuple is not already stored in the appropriate row(s), the system can add the identifier tuple to the appropriate row(s).

The system maintains a second data structure that stores arrays of computer security data (404). In some implementations, the second data structure is a table that includes rows (or columns) of computer security data. For example, the second data structure can be a computer security data table that includes, for each of multiple identifier tuples, one or more rows of computer security data. The system can maintain the second data structure by adding computer security data to the second data structure in response to receiving telemetry data, as described above.

For example, when new telemetry data is received, the system can determine whether the computer security data is already stored in the appropriate row(s) of the computer security data table (e.g., in the row(s) corresponding to the identifier tuple identified in the telemetry data). If the rows are time bucketed, the system can determine whether the computer security data is stored in the row(s) that correspond to the identifier tuple and that correspond to a time period in which the time stamp of the new telemetry data falls. If the computer security data is not already stored in the appropriate row(s), the system can add the computer security data to the appropriate row(s).

The system receives a query that specifies an identifier for a computing element (406). For example, the system can receive the query from a client device and the computing element may be computing device (e.g., computer, smartphone, tablet, network device, virtual assistant, etc.), software (e.g., a particular antivirus software that detected a virus or an application that sent data that included malware), or other computing element (e.g., a particular virtual machine in which malware has been detected). The identifiers can be in the form of IP addresses, MAC addresses, machine names, user names, software names, etc. The query can also specify a time or time range, a source type, and/or an identifier type.

The system obtains, from the first data structure, one or more identifier tuples that each includes the identifier specified by the query (408). The system can compare the identifier specified by the query (and optionally the time, source type, and/or identifier type) to keys (e.g., row keys) of the first data structure to identify one or more arrays (e.g., rows) of the first data structure that match the query. From each matching array, the system can obtain the identifier tuples included in the matching array.

The system obtains, from the second data structure, computer security data for each identifier tuple obtained from the first data structure (410). The system can compare each identifier tuple to keys (e.g., row keys) of the second data structure to identify one or more arrays (e.g., rows) of the second data structure that match the query. For each matching array, the system can obtain the computer security data included in the matching array.

In some implementations, the system uses parallel processing techniques to obtain the computer security data from the second data structure. For example, the system can use a different computer for each identifier tuple. That is, each different computer can obtain the computer security data for a different identifier tuple than each other computer.

The system can provide the obtained computer security data for presentation at the client device from which the query was received (412). The system can also provide the identifiers of the identifier tuples obtained from the first data structure for presentation at the client device. For example, the client device can present a list of related identifiers that are related to the identifier specified by the query (e.g., over the time period specified by the query). The client device can also present the computer security data, e.g., data describing computer security events in which the related identifiers were involved.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    maintaining a first data structure that stores arrays of identifier tuples, wherein:
        the first data structure is a first table and each array of identifier tuples is a row of the first table that includes a cell for each identifier tuple in the array;
        each identifier tuple corresponds to a respective computer security event and includes one or more identifiers for a computing element associated with the computer security event;
        each array of identifier tuples corresponds to a respective identifier and only includes identifier tuples that include the corresponding identifier; and
        each tuple for each cell in a particular row is a list of a plurality of elements of element types, and each tuple in each cell in a particular row has an element of each of the plurality of element types;
    maintaining a second data structure that stores arrays of computer security data, wherein:
        the second data structure is a second table and each array of computer security data is a row of the second table that includes a cell for each portion of computer security data in the array; and
        each array of computer security data corresponds to a respective identifier tuple stored in the first data structure and only includes computer security data associated with each identifier in the corresponding identifier tuple;
    receiving, from a client device, a query that specifies a first identifier for a first computing element;
        obtaining, from the first data structure and using the first identifier, one or more identifier tuples that each include the first identifier;
        for each of the one or more identifier tuples, obtaining, from the second data structure, computer security data included in at least one array of computer security data corresponding to the identifier tuple; and
        providing the obtained computer security data for presentation at the client device;
    wherein:
        each row of the first table includes a first row key that is based on the corresponding identifier for the row and a respective first time period, wherein each identifier tuple in the row corresponds to a computer security event that occurred within the first time period; and
        each row of the second table includes a second row key that is based on the corresponding identifier tuple for the row and a respective second time period, wherein each portion of computer security data in the row corresponds to a computer security event that occurred within the second time period.

2. The method of claim 1, wherein:
    the query specifies a time period;
    obtaining, from the first data structure and using the first identifier, the one or more identifier tuples that each include the first identifier comprises:
        identifying each array of identifier tuples in the first data structure that has a first row key that is based on the first identifier and a first time period that is within the time period specified by the query; and obtaining each identifier tuple included in each identified array of identifier tuples.

3. The method of claim 2, wherein obtaining, from the second data structure, computer security data included in at least one array of computer security corresponding to the identifier tuple comprises:
identifying each array of computer security data in the second data structure that has a second row key that is based on (i) one of the identifier tuples included in each identified array of identifier tuples and (ii) a second time period that is within the time period specified by the query; and
obtaining the computer security data included in each identified array of computer security data.

4. The method of claim 1, wherein:
the first row key for each row of the first table is based on a particular source type and each identifier tuple in the row includes identifiers that were obtained from a computer security data item received from a source of the particular source type;
the query specifies a source type; and
obtaining, from the first data structure and using the first identifier, the one or more identifier tuples that each include the first identifier comprises:
identifying each array of identifier tuples in the first data structure that has a row key that is based on the first identifier and the particular source type specified by the query; and
obtaining each identifier tuple included in each identified array of identifier tuples.

5. The method of claim 4, wherein obtaining, from the second data structure, computer security data included in at least one array of computer security data corresponding to the identifier tuple comprises:
identifying each array of computer security data in the second data structure that has a row key that is based on (i) one of the tuples included in each identified array of identifier tuples and (ii) the source type specified by the query; and
obtaining the computer security data included in each identified array of computer security data.

6. The method of claim 1, further comprising:
receiving a new computer security item that includes (i) identifiers that correspond to a new computer security event and (ii) computer security data for the new computer security event;
adding, to the first table, a new identifier tuple that includes the identifiers that correspond to the new computer security event; and
adding, to the second table, the computer security data for the new computer security event.

7. The method of claim 6, wherein adding, to the first table, a new identifier tuple that includes the identifiers that correspond to the new computer security event comprises:
identifying a row of the first table that corresponds to a first identifier of the new identifier tuple;
determining that the identified row does not include an identifier tuple that matches the new identifier tuple; and
adding the new identifier tuple to the identified row.

8. The method of claim 6, wherein adding, to the second table, the computer security data for the new computer security event comprises:
identifying a row of the second table that corresponds to the new identifier tuple; and
adding the computer security data for the new computer security event to the identified row.

9. A system comprising:
a data processing apparatus; and
a computer storage medium encoded with a computer program, the program comprising data processing apparatus instructions that when executed by the data processing apparatus cause the data processing apparatus to perform operations comprising:
maintaining a first data structure that stores arrays of identifier tuples, wherein:
the first data structure is a first table and each array of identifier tuples is a row of the first table that includes a cell for each identifier tuple in the array;
each identifier tuple corresponds to a respective computer security event and includes one or more identifiers for a computing element associated with the computer security event;
each array of identifier tuples corresponds to a respective identifier and only includes identifier tuples that include the corresponding identifier; and
each tuple for each cell in a particular row is a list of a plurality of elements of element types, and each tuple in each cell in a particular row has an element of each of the plurality of element types;
maintaining a second data structure that stores arrays of computer security data, wherein:
the second data structure is a second table and each array of computer security data is a row of the second table that includes a cell for each portion of computer security data in the array; and
each array of computer security data corresponds to a respective identifier tuple stored in the first data structure and only includes computer security data associated with each identifier in the corresponding identifier tuple;
receiving, from a client device, a query that specifies a first identifier for a first computing element;
obtaining, from the first data structure and using the first identifier, one or more identifier tuples that each include the first identifier;
for each of the one or more identifier tuples, obtaining, from the second data structure, computer security data included in at least one array of computer security data corresponding to the identifier tuple; and
providing the obtained computer security data for presentation at the client device;
wherein:
each row of the first table includes a first row key that is based on the corresponding identifier for the row and a respective first time period, wherein each identifier tuple in the row corresponds to a computer security event that occurred within the first time period; and
each row of the second table includes a second row key that is based on the corresponding identifier tuple for the row and a respective second time period, wherein each portion of computer security data in the row corresponds to a computer security event that occurred within the second time period.

10. The system of claim 9, wherein:
the query specifies a time period;
obtaining, from the first data structure and using the first identifier, the one or more identifier tuples that each include the first identifier comprises:
identifying each array of identifier tuples in the first data structure that has a first row key that is based on the first identifier and a first time period that is within the time period specified by the query; and
obtaining each identifier tuple included in each identified array of identifier tuples.

11. The system of claim 10, wherein obtaining, from the second data structure, computer security data included in at least one array of computer security corresponding to the identifier tuple comprises:
identifying each array of computer security data in the second data structure that has a second row key that is based on (i) one of the identifier tuples included in each identified array of identifier tuples and (ii) a second time period that is within the time period specified by the query; and
obtaining the computer security data included in each identified array of computer security data.

12. The system of claim 9, wherein:
the first row key for each row of the first table is based on a particular source type and each identifier tuple in the row includes identifiers that were obtained from a computer security data item received from a source of the particular source type;
the query specifies a source type; and
obtaining, from the first data structure and using the first identifier, the one or more identifier tuples that each include the first identifier comprises:
identifying each array of identifier tuples in the first data structure that has a row key that is based on the first identifier and the particular source type specified by the query; and
obtaining each identifier tuple included in each identified array of identifier tuples.

13. The system of claim 12, wherein obtaining, from the second data structure, computer security data included in at least one array of computer security data corresponding to the identifier tuple comprises:
identifying each array of computer security data in the second data structure that has a row key that is based on (i) one of the tuples included in each identified array of identifier tuples and (ii) the source type specified by the query; and
obtaining the computer security data included in each identified array of computer security data.

14. The system of claim 9, wherein the operations comprise:
receiving a new computer security item that includes (i) identifiers that correspond to a new computer security event and (ii) computer security data for the new computer security event;
adding, to the first table, a new identifier tuple that includes the identifiers that correspond to the new computer security event; and
adding, to the second table, the computer security data for the new computer security event.

15. The system of claim 14, wherein adding, to the first table, a new identifier tuple that includes the identifiers that correspond to the new computer security event comprises:
identifying a row of the first table that corresponds to a first identifier of the new identifier tuple;
determining that the identified row does not include an identifier tuple that matches the new identifier tuple; and
adding the new identifier tuple to the identified row.

16. A non-transitory computer storage medium encoded with a computer program, the program comprising instructions that when executed by one or more data processing apparatus cause the data processing apparatus to perform operations comprising:
maintaining a first data structure that stores arrays of identifier tuples, wherein:
the first data structure is a first table and each array of identifier tuples is a row of the first table that includes a cell for each identifier tuple in the array;
each identifier tuple corresponds to a respective computer security event and includes one or more identifiers for a computing element associated with the computer security event;
each array of identifier tuples corresponds to a respective identifier and only includes identifier tuples that include the corresponding identifier; and
each tuple for each cell in a particular row is a list of a plurality of elements of element types, and each tuple in each cell in a particular row has an element of each of the plurality of element types;
maintaining a second data structure that stores arrays of computer security data, wherein:
the second data structure is a second table and each array of computer security data is a row of the second table that includes a cell for each portion of computer security data in the array; and
each array of computer security data corresponds to a respective identifier tuple stored in the first data structure and only includes computer security data associated with each identifier in the corresponding identifier tuple;
receiving, from a client device, a query that specifies a first identifier for a first computing element;
obtaining, from the first data structure and using the first identifier, one or more identifier tuples that each include the first identifier;
for each of the one or more identifier tuples, obtaining, from the second data structure, computer security data included in at least one array of computer security data corresponding to the identifier tuple; and
providing the obtained computer security data for presentation at the client device;
wherein:
each row of the first table includes a first row key that is based on the corresponding identifier for the row and a respective first time period, wherein each identifier tuple in the row corresponds to a computer security event that occurred within the first time period; and
each row of the second table includes a second row key that is based on the corresponding identifier tuple for the row and a respective second time period, wherein each portion of computer security data in the row corresponds to a computer security event that occurred within the second time period.

* * * * *